(12) United States Patent
Zhang (10) Patent No.: US 10,489,638 B2
(45) Date of Patent: Nov. 26, 2019

(54) VISUAL TRACKING METHOD AND ROBOT BASED ON MONOCULAR GESTURE RECOGNITION

(71) Applicant: Nanjing AvatarMind Robot Technology Co., Ltd., Nanjing (CN)

(72) Inventor: Lei Zhang, Nanjing (CN)

(73) Assignee: Nanjing AvatarMind Robot Technology Co., Ltd., Nanjing (CN)

( * ) Notice: Subject to any disclaimer, the term of this patent is extended or adjusted under 35 U.S.C. 154(b) by 139 days.

(21) Appl. No.: 15/843,647

(22) Filed: Dec. 15, 2017

(65) Prior Publication Data

US 2018/0129872 A1 May 10, 2018

Related U.S. Application Data (63) Continuation of application No. PCT/CN2017/107905, filed on Oct. 26, 2017.

(30) Foreign Application Priority Data

Nov. 9, 2016 (CN) .......................... 2016 1 0984710

(51) Int. Cl.
*G06K 9/00* (2006.01)
*G06K 9/32* (2006.01)
(Continued)

(52) U.S. Cl.
CPC ........ *G06K 9/00335* (2013.01); *B25J 9/1697* (2013.01); *G05D 1/0246* (2013.01);
(Continued)

(58) Field of Classification Search
CPC ............. G06K 9/00335; G06K 9/3216; G06K 2009/3291; Y10S 901/01; Y10S 901/47; G05D 1/0246; G05D 1/12; B25J 9/1697
See application file for complete search history.

(56) References Cited

U.S. PATENT DOCUMENTS

| 6,240,198 B1 * | 5/2001 | Rehg ................. G06K 9/00369 382/103 |
| 2019/0184572 A1 * | 6/2019 | Hayashi .................... B25J 5/00 |

FOREIGN PATENT DOCUMENTS

| CN | 104679242 | * | 6/2015 | ............... G06F 3/01 |
| KR | 101190615 | * | 10/2012 | .............. B25J 13/00 |

OTHER PUBLICATIONS

Angel et al ("Control and Guidance of Low-Cost Robots via Gesture Perception for Monitoring Activities in the Home", Sensors 2015, 15, pp. 31268-31292; doi:10.3390/s151229853) (Year: 2015).*

(Continued)

*Primary Examiner* — Amara Abdi (57) ABSTRACT

The present disclosure discloses a visual tracking method based on gesture recognition and a robot thereof. By recognizing a feature gesture, an accurate offset angle between a robot and a tracking target is obtained in real time, accurate tracking is facilitated, and the tracking is more natural. In addition, an initial distance thereof may be measured by a single-point ranging module. By recognizing a feature gesture, an accurate relative distance between the robot and the tracking target is obtained in real time, and thus the tracking accuracy is higher. The tracking method and the robot according to the present disclosure achieve a higher accuracy over color patch tracking, and have a greatly reduced cost over the 3D sensing solution. This greatly improves accuracy of the tracking. Therefore, user interactions are smoother, the operation key points may be simply mastered, and the use is convenient.

9 Claims, 7 Drawing Sheets

(51) Int. Cl.
*G05D 1/02* (2006.01)
*B25J 9/16* (2006.01)
*G05D 1/12* (2006.01)

(52) U.S. Cl.
CPC ............ *G05D 1/12* (2013.01); *G06K 9/3216* (2013.01); *G06K 2009/3291* (2013.01); *Y10S 901/01* (2013.01); *Y10S 901/47* (2013.01)

(56) References Cited

OTHER PUBLICATIONS

Kapusta et al , ("Person Tracking and Gesture Recognition in Challenging Visibility Conditions Using 3D Thermal Sensing", 2015 IEEE, pp. 1112-1119) (Year: 2015).*

* cited by examiner

VISUAL TRACKING METHOD AND ROBOT BASED ON MONOCULAR GESTURE RECOGNITION

CROSS-REFERENCE TO RELATED APPLICATIONS

This application is a continuation application of international patent application PCT/CN2017/107905, filed on Oct. 26, 2017, which is based upon and claims priority of Chinese Patent Application No. 201610984710.1, filed before Chinese Patent Office on Nov. 9, 2016 and entitled "VISUAL TRACKING METHOD AND ROBOT BASED ON MONOCULAR GESTURE RECOGNITION", the entire contents of which are incorporated herein by reference.

TECHNICAL FIELD

The present disclosure relates to the technical field of robots surveillance, and in particular, relates to a vision tracking method and robot based on monocular gesture recognition.

BACKGROUND

At present, most of the household service robots have a monocular camera, and the human body tracking system based on the monocular camera generally employ color patch tracking. In this manner, during startup of a program, a preview region of the monocular camera is specified, and a target is constantly tracked as the target moves. However, the method has the following defects:

1. The color patch tracking implements tracking according to a specified initial color patch, and the robot may miss the target due to the defects of the color patch tracking.
2. The operation is complicated, and it is hard for users to understand the operation key point.

SUMMARY

The present disclosure is intended to provide a visual tracking method based on monocular gesture recognition and a robot thereof. With the method, by recognizing a feature gesture, an accurate space offset ratio of the robot to an initial position is acquired, to achieve accurate tracking. The operation is simple and the cost is low.

To achieve the above objective, the present disclosure provides visual tracking method based on monocular gesture recognition. The method includes the following steps:

S1: upon receiving a tracking instruction, acquiring an initial distance from a robot to a tracking target and an actual height of a gesture of the tracking target;

S2: if the tracking target is tracked and a predetermined photographing time interval is reached, photographing a tracking scenario picture containing the gesture of the tracking target by using a monocular camera of the robot;

S3: recognizing the gesture in the tracking scenario picture to obtain start coordinates and a size parameter of the gesture in the tracking scenario picture;

S4: calculating a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera;

S5: comparing the current distance with a predetermined distance threshold range to obtain a first comparison result;

S6: comparing the offset angle with a predetermined angle threshold range to obtain a second comparison result; and S7: controlling the robot to perform a corresponding tracking operation according to the first comparison result and the second comparison result.

Further step S1 specifically includes the following steps:

upon receiving the tracking instruction, measuring the initial distance from the robot to the tracking target by using a single-point ranging module of the robot;

photographing an initial scenario picture containing the gesture of the tracking target by using the monocular camera of the robot;

recognizing the gesture in the initial scenario picture to obtain start coordinates and a height parameter of the gesture in the initial scenario picture; and calculating an actual height of an initial scenario corresponding to the initial scenario picture according to the initial distance and the predetermined visual angle of the monocular camera;

calculating the actual height of the gesture of the tracking target according to the actual height of the initial scenario corresponding to the initial scenario picture, the height parameter of the gesture in the initial scenario picture, and the predetermined picture resolution of the monocular camera.

Further, the actual height of the initial scenario corresponding to the initial scenario picture is calculated according to the initial distance and the predetermined visual angle of the monocular camera using the following formula:

$$H3 = 2 * \tan \alpha * D1 \quad (1)$$

wherein in formula (1), H3 denotes the actual height of the initial scenario corresponding to the initial scenario picture, α denotes the predetermined visual angle of the monocular camera, and D1 denotes the initial distance.

Further, the actual height of the gesture of the tracking target according to the actual height of the initial scenario corresponding to the initial scenario picture, the height parameter of the gesture in the initial scenario picture, and the predetermined picture resolution of the monocular camera by using the following formula:

$$H4 = H2 * H3 / H1 \quad (3)$$

wherein in formula (3), H4 denotes the actual height of the gesture of the tracking target, H2 denotes the height parameter of the gesture in the initial scenario picture, H1 denotes a height resolution in the predetermined picture resolution of the monocular camera, and H3 denotes the actual height of the initial scenario corresponding to the initial scenario picture.

Further, in step S4, the current distance from the robot to the tracking target is calculated by using the following formulae:

$$H6 = H1 * H4 / H5 \quad (4)$$

wherein in formula (4), H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture;

$$D2 = H6 / (2 * \tan \alpha) \quad (5)$$

wherein in formula (5), D2 denotes the current distance from the robot to the tracking target, H6 denotes the actual height of the tracking scenario corresponding to the tracking scenario picture, and a denotes the predetermined visual angle of the monocular camera.

Further, in step S4, the calculating an offset angle of the gesture in the X axis of an actual space includes the following steps:

calculating central coordinates of the gesture in the tracking scenario picture according to the start coordinates of the gesture in the tracking scenario picture and the size parameter of the gesture in the tracking scenario picture;

calculating a picture offset amount of the central coordinates of the gesture in the tracking scenario picture in the X axis relative to central coordinates of the tracking scenario picture according to the predetermined picture resolution of the monocular camera and the central coordinates of the gesture in the tracking scenario picture;

calculating an actual offset amount of the gesture of the tracking target in the X axis of the actual space according to the picture offset amount, the actual height of the gesture, the size parameter of the gesture in the tracking scenario picture, and the predetermined picture resolution of the monocular camera; and calculating the offset angle of the gesture in the X axis of the actual space according to the actual offset amount and the current distance from the robot to the tracking target.

Further, the central coordinates of the gesture in the tracking scenario picture are calculated according to the start coordinates of the gesture in the tracking scenario picture and the size parameter of the gesture in the tracking scenario picture by using the following formulae:

$$X4=X3+(W4/2) \tag{6}$$

wherein in formula (6), X4 denotes an X axis coordinate of the central coordinates of the gesture in the tracking scenario picture, X3 denotes an X axis start coordinate of the start coordinates of the gesture in the tracking scenario picture, and W4 denotes a width parameter in the size parameter of the gesture in the tracking scenario picture; and $$Y4=Y3+(H5/2) \tag{7}$$

wherein in formula (7), Y4 denotes a Y axis coordinate of the central coordinates of the gesture in the tracking scenario picture, Y3 denotes a Y axis start coordinate of the start coordinates of the gesture in the tracking scenario picture, and H5 denotes a height parameter in the size parameter of the gesture in the tracking scenario picture.

Further, the picture offset amount of the central coordinates of the gesture in the tracking scenario picture in the X axis relative to central coordinates of the tracking scenario picture are calculated according to the predetermined picture resolution of the monocular camera and the central coordinates of the gesture in the tracking scenario picture by using the following formula:

$$O1=X4-(W1/2) \tag{8}$$

wherein in formula (8), O1 denotes the picture offset amount of the central coordinates of the gesture in the tracking scenario picture in the X axis relative to the central coordinates of the tracking scenario picture, X4 denotes the X axis coordinate of the central coordinates of the gesture in the tracking scenario picture, and W1 denotes a width resolution in the predetermined picture resolution of the monocular camera; and the actual offset amount of the gesture of the tracking target in the X axis of the actual space is calculated according to the picture offset amount, the actual height of the gesture, the size parameter of the gesture in the tracking scenario picture, and the predetermined picture resolution of the monocular camera by using the following formulae:

$$H6=H1*H4/H5 \tag{4}$$

wherein in formula (4), H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture;

$$W5=W1*H6/H1 \tag{10}$$

wherein in formula (10), W5 denotes an actual width of the tracking scenario corresponding to the tracking scenario picture, W1 denotes the width resolution in the predetermined picture resolution of the monocular camera, and H6 denotes an actual height of the tracking scenario corresponding to the tracking scenario picture; and $$O2=O1*W5/W1 \tag{11}$$

wherein in formula (11), O1 denotes the picture offset amount of the central coordinates of the gesture in the tracking scenario picture in the X axis relative to the central coordinates of the tracking scenario picture, W5 denotes the actual width of the tracking scenario corresponding to the tracking scenario picture, and W1 denotes the width resolution in the predetermined picture resolution of the monocular camera, and O2 denotes the actual offset amount of the gesture of the tracking target in the X axis of the actual space.

Further, the offset angle of the gesture in the X axis of the actual space is calculated according to the actual offset amount and the current distance from the robot to the tracking target by using the following formula:

$$\beta 2=\arctan(O2/D2) \tag{9}$$

wherein in formula (9), β2 denotes the offset angle of the gesture in the X axis of the actual space, O2 denotes the actual offset amount of the gesture of the tracking target in the X axis of the actual space, and D2 denotes the current distance from the robot to the tracking target.

The present disclosure further provides a robot. The robot includes:

a single-point ranging module, configured to, upon receiving a tracking instruction, acquire an initial distance from the robot to a tracking target;

a calculating module, configured to, upon receiving the tracking instruction, acquire an actual height of a gesture of the tracking target;

a monocular camera, configured to, if the tracking target is tracked and a predetermined photographing time interval is reached, photograph a tracking scenario picture containing the gesture of the tracking target;

a recognizing module, configured to recognize the gesture in the tracking scenario picture to obtain start coordinates and a size parameter of the gesture in the tracking scenario picture;

wherein the calculating module is further configured to calculate a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera;

a comparing module, configured to compare the current distance with a predetermined distance threshold range to obtain a first comparison result, and compare the offset angle with a predetermined angle threshold range to obtain a second comparison result; and an executing module, configured to control the robot to perform a corresponding tracking operation according to the first comparison result and the second comparison result.

Further, the monocular camera is further configured to photograph an initial scenario picture containing the gesture of the tracking target by using the monocular camera of the robot; the recognizing module is further configured to recognize the gesture in the initial scenario picture to obtain start coordinates and a height parameter of the gesture in the initial scenario picture; and the calculating module is further configured to calculate an actual height of an initial scenario corresponding to the initial scenario picture according to the initial distance and the predetermined visual angle of the monocular camera, and calculate the actual height of the gesture of the tracking target according to the actual height of the initial scenario corresponding to the initial scenario picture, the height parameter of the gesture in the initial scenario picture, and the predetermined picture resolution of the monocular camera.

Further, the actual height of the initial scenario corresponding to the initial scenario picture is calculated according to the initial distance and the predetermined visual angle of the monocular camera using the following formula:

$$H3 = 2 * \tan \alpha * D1 \qquad (1)$$

wherein in formula (1), H3 denotes the actual height of the initial scenario corresponding to the initial scenario picture, α denotes the predetermined visual angle of the monocular camera, and D1 denotes the initial distance.

Further, the actual height of the gesture of the tracking target according to the actual height of the initial scenario corresponding to the initial scenario picture, the height parameter of the gesture in the initial scenario picture, and the predetermined picture resolution of the monocular camera by using the following formula:

$$H4 = H2 * H3 / H1 \qquad (3)$$

wherein in formula (3), H4 denotes the actual height of the gesture of the tracking target, H2 denotes the height parameter of the gesture in the initial scenario picture, H1 denotes a height resolution in the predetermined picture resolution of the monocular camera, and H3 denotes the actual height of the initial scenario corresponding to the initial scenario picture.

Further, the current distance from the robot to the tracking target is calculated according to the actual height of the gesture, a predetermined picture resolution of the monocular camera, the start coordinates of the gesture in the tracking scenario picture, the size parameter of the gesture in the tracking scenario picture, and the predetermined visual angle of the monocular camera by using the following formulae:

$$H6 = H1 * H4 / H5 \qquad (4)$$

wherein in formula (4), H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture;

$$D2 = H6 / (2 * \tan \alpha) \qquad (5)$$

wherein in formula (5), D2 denotes the current distance from the robot to the tracking target, H6 denotes the actual height of the tracking scenario corresponding to the tracking scenario picture, and α denotes the predetermined visual angle of the monocular camera.

Further, the calculating module is further configured to:

calculate central coordinates of the gesture in the tracking scenario picture according to the start coordinates of the gesture in the tracking scenario picture and the size parameter of the gesture in the tracking scenario picture;

calculate a picture offset amount of the central coordinates of the gesture in the tracking scenario picture in the X axis relative to central coordinates of the tracking scenario picture according to the predetermined picture resolution of the monocular camera and the central coordinates of the gesture in the tracking scenario picture;

calculate an actual offset amount of the gesture of the tracking target in the X axis of the actual space according to the picture offset amount, the actual height of the gesture, the size parameter of the gesture in the tracking scenario picture, and the predetermined picture resolution of the monocular camera; and calculate the offset angle of the gesture in the X axis of the actual space according to the actual offset amount and the current distance from the robot to the tracking target.

Further, the central coordinates of the gesture in the tracking scenario picture are calculated according to the start coordinates of the gesture in the tracking scenario picture and the size parameter of the gesture in the tracking scenario picture by using the following formulae:

$$X4 = X3 + (W4/2) \qquad (6)$$

wherein in formula (6), X4 denotes an X axis coordinate of the central coordinates of the gesture in the tracking scenario picture, X3 denotes an X axis start coordinate of the start coordinates of the gesture in the tracking scenario picture, and W4 denotes a width parameter in the size parameter of the gesture in the tracking scenario picture; and $$Y4 = Y3 + (H5/2) \qquad (7)$$

wherein in formula (7), Y4 denotes a Y axis coordinate of the central coordinates of the gesture in the tracking scenario picture, Y3 denotes a Y axis start coordinate of the start coordinates of the gesture in the tracking scenario picture, and H5 denotes a height parameter in the size parameter of the gesture in the tracking scenario picture.

Further, the picture offset amount of the central coordinates of the gesture in the tracking scenario picture in the X axis relative to central coordinates of the tracking scenario picture are calculated according to the predetermined picture resolution of the monocular camera and the central coordinates of the gesture in the tracking scenario picture by using the following formula:

$$O1 = X4 - (W1/2) \qquad (8)$$

wherein in formula (8), O1 denotes the picture offset amount of the central coordinates of the gesture in the tracking scenario picture in the X axis relative to the central coordinates of the tracking scenario picture, X4 denotes the X axis coordinate of the central coordinates of the gesture in the tracking scenario picture, and W1 denotes a width resolution in the predetermined picture resolution of the monocular camera; and the actual offset amount of the gesture of the tracking target in the X axis of the actual space is calculated according to the picture offset amount, the actual height of the gesture, the size parameter of the gesture in the tracking scenario picture, and the predetermined picture resolution of the monocular camera by using the following formulae:

$$H6 = H1*H4/H5 \quad (4)$$

wherein in formula (4), H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture;

$$W5 = W1*H6/H1 \quad (10)$$

wherein in formula (10), W5 denotes an actual width of the tracking scenario corresponding to the tracking scenario picture, W1 denotes the width resolution in the predetermined picture resolution of the monocular camera, and H6 denotes an actual height of the tracking scenario corresponding to the tracking scenario picture; and $$O2 = O1*W5/W1 \quad (11)$$

wherein in formula (11), O1 denotes the picture offset amount of the central coordinates of the gesture in the tracking scenario picture in the X axis relative to the central coordinates of the tracking scenario picture, W5 denotes the actual width of the tracking scenario corresponding to the tracking scenario picture, and W1 denotes the width resolution in the predetermined picture resolution of the monocular camera, and O2 denotes the actual offset amount of the gesture of the tracking target in the X axis of the actual space.

Further, the offset angle of the gesture in the X axis of the actual space is calculated according to the actual offset amount and the current distance from the robot to the tracking target by using the following formula:

$$\beta 2 = \arctan(O2/D2) \quad (9)$$

wherein in formula (9), β2 denotes the offset angle of the gesture in the X axis of the actual space, O2 denotes the actual offset amount of the gesture of the tracking target in the X axis of the actual space, and D2 denotes the current distance from the robot to the tracking target.

The present disclosure provides a visual tracking method based on gesture recognition and a robot thereof. By recognizing a feature gesture, an accurate offset angle between a robot and a tracking target is obtained in real time, accurate tracking is facilitated, and the tracking is more natural. In addition, an initial distance thereof may be measured by a single-point ranging module. During the tracking process, by recognizing a feature gesture, an accurate relative distance between the robot and a person (that is, the tracking target) is obtained in real time, and thus the tracking accuracy is higher. The tracking method and the robot according to the present disclosure achieve a higher accuracy over color patch tracking, and have a greatly reduced cost over the 3D sensing solution. Therefore, the effect is better, user interactions are smoother, the operation key points may be simply mastered, and the use is convenient.

DETAILED DESCRIPTION

A visual tracking method based on monocular gesture recognition is described hereinafter using a human body as a tracking target with reference to the accompanying drawings.

Figure 6:
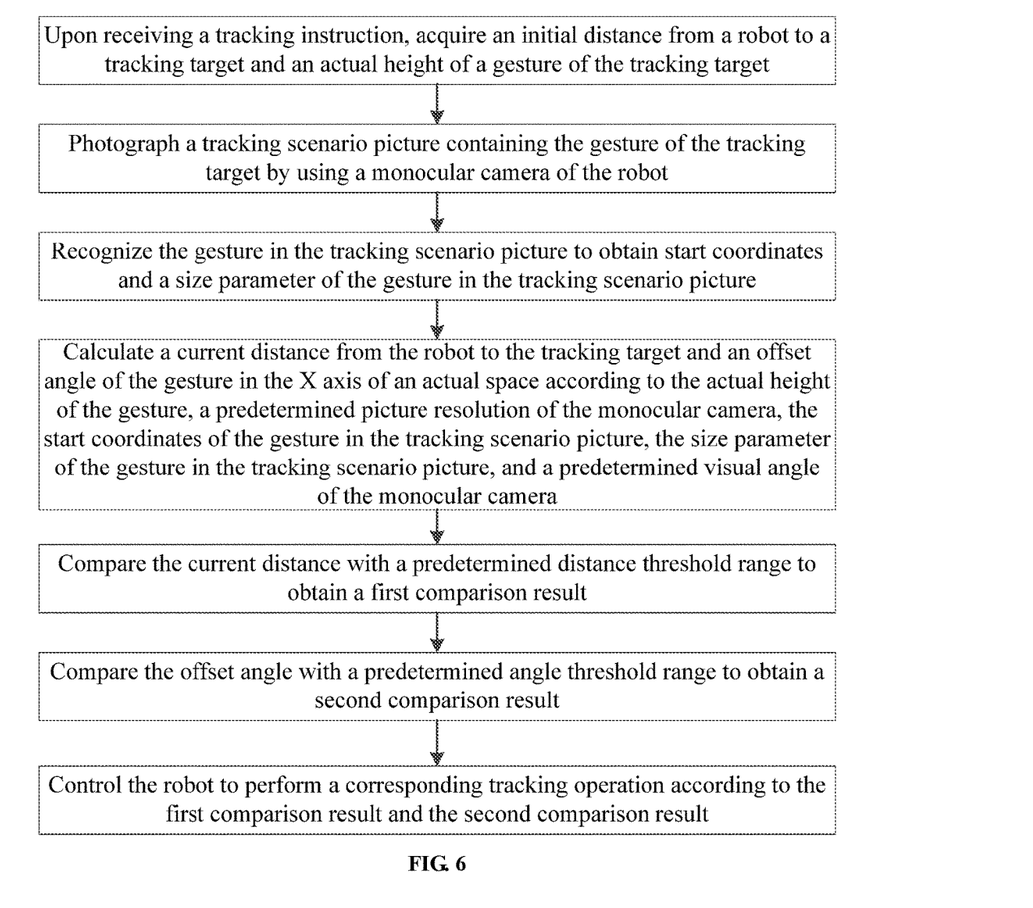
FIG. 6 is a flowchart of a visual tracking method based on monocular gesture recognition according to an embodiment of the present disclosure.

In an embodiment of the present disclosure, as illustrated in FIG. 6, a visual tracking method based on monocular gesture recognition is provided. The method includes the following steps:

S1: upon receiving a tracking instruction, acquiring an initial distance from a robot to a tracking target and an actual height of a gesture of the tracking target;

S2: if the tracking target is tracked and a predetermined photographing time interval is reached, photographing a tracking scenario picture containing the gesture of the tracking target by using a monocular camera of the robot;

S3: recognizing the gesture in the tracking scenario picture to obtain start coordinates and a size parameter of the gesture in the tracking scenario picture;

S4: calculating a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera;

S5: comparing the current distance with a predetermined distance threshold range to obtain a first comparison result;

S6: comparing the offset angle with a predetermined angle threshold range to obtain a second comparison result; and S7: controlling the robot to perform a corresponding tracking operation according to the first comparison result and the second comparison result.

Specifically, the initial distance from the robot to the tracking target may be measured by a single-point ranging module, or may be manually input by a user. In consideration of convenience of the user, it is suggested that the measurement is practiced by the single-point ranging module.

The gesture may be practiced by a specific gesture, or may be practiced by other parts of the human body (for example, the face). The actual height of the gesture of the tracking target may be calculated in a preparation process (that is, an initialization process).

Upon acquiring the initial distance and the actual height of the gesture, the robot starts performing the tracking operation. The implementation of the tracking mainly includes: photographing the tracking scenario picture containing the gesture of the tracking target, determining whether the robot is far from the tracking target and whether the tracking target exceeds the predetermined angle threshold range according to the tracking scenario picture, the initial distance, the actual height of the gesture and the like information, and adjusting advance, retreat, angle and the like operation and cyclically performing the above steps, such that the robot may track the tracking target. During the tracking process, the monocular camera may photograph the tracking scenario picture according to a predetermined time interval, for example, a predetermined time interval of 1 second, and photograph a tracking scenario picture each second and perform a tracking operation to ensure that the robot has a good tracking state relative to the tracking target (person).

The predetermined distance threshold range may be determined according to a comfort degree of man-machine interaction. The tracking by the robot needs to cause no discomfort to the person (the tracking target). For example, a distance less than 0.5 m may not cause any discomfort to the tracking target. However, a distance between 1 m and 2 m may cause discomfort to man-machine interaction. In addition to man-machine interaction, such factors as the hardware restriction (visual distance and visual angle) and the tracking algorithm (or, motion algorithm) also need to be considered, to finally obtain a comfort interval threshold.

The visual distance is considered, because a small distance (for example, a distance smaller than 0.5 m) may result in that the tracking target exceeds the entire visual field or the calculation workload is great, and a great distance (for example, a distance greater than 5 m, wherein the specific distance may be determined according to the resolution of the camera, the clarity of the camera, and the CPU calculation capability) may result in that the tracking target is small and the recognition time is increased. The above three cases of exceeding the visual field, too small tracking target, over-great calculation workload may all result in an increase of the recognition time and a decrease of recognition rate, which is unfavorable to implementation of the tracking algorithm.

The visual angle is considered because the visual angle affects the visible image area in case of the same distance. This may cause the selected predetermined distance threshold range to vary. The height of the camera of the robot may also be an important factor affecting the visual angle projection area.

The tracking algorithm may consider the movement speed and turning capability of the robot. Therefore, the predetermined distance threshold range needs to be determined according to the tracking algorithm. In this embodiment, the predetermined distance threshold range may be defined as between 1 m and 1.5 m. Nevertheless, predetermined distance threshold range may also be defined as between 1 m and 1.5 m.

The predetermined angle threshold range may also be impacted by factors in two aspects.

1. The predetermined angle threshold range is affected by comfort degree of man-machine interaction. The angle shall not be frequently adjusted, and otherwise, a feeling that the robot walks unstably may be caused or it may be considered that the program encounters a fault (the center point is frequently searched). Therefore, an offset within a specific range at the front center point in the route from the tracking target to the robot may be ignored. Therefore, a predetermined angle threshold range is defined, and the angle is adjusted only if the tracking target is not within the range, such that the tracking is smoother. Generally, using a distance between 1 m and 1.5 m as an example, within a horizontal visual angle of ±15°, it may not be considered that the tracking error is great, and the angle does not need to be frequently adjusted.

2. The predetermined angle threshold range by the horizontal visual angle of the monocular camera. The predetermined angle threshold range should be smaller than the horizontal visual angle at a specific amplitude (a specific angle is preserved to recognize the tracking target, and prevent the tracking target from moving out of the visual field and then being missed). For example, if the horizontal visual angle of the monocular camera is 65° (the photographing angle is between −32.5° and 32.5°), it is appropriate that the predetermined angle threshold range is between −15° and 15°.

The current distance is compared with the predetermined distance threshold range to obtain a first comparison result. The following three cases may occur. Using the predetermined distance threshold range between 1 m (Dx) and 1.5 m (Dy) as an example, the three cases and the corresponding distance tracking operations are listed in Table 1.

TABLE 1

| First comparison result | Performed distance tracking operation |
| --- | --- |
| Current distance > Dy | Move by a distance towards the tracking target, wherein the distance is equal to the current − Dx. |
| Dx ≤ current distance ≤ Dy | No movement. |
| Current distance < Dx | Move by a distance away from the tracking target, wherein the distance is equal to Dx − the current distance. |

The offset angle is compared with the predetermined angle threshold range to obtain a second comparison result. The following three cases may occur. Using the predetermined angle threshold range between −15 (−βy)° and 15° (βy) as an example, the three cases and the corresponding angle tracking operations are listed in Table 2.

TABLE 2

| Second comparison result | Performed angle tracking operation |
| --- | --- |
| Offset angle > βy or; Offset angle < −βy | If the robot is in a move-forward state, the robot increases the move-forward angular speed, for example, 2°/S (the angular speed is determined according to the movement distance, the movement speed and the offset angle) to adjust the offset angle to 0°, adjusts the tracking target to the front of the robot. If in this case the robot is in a stop state, the robot may rotate by a specific angle which is an offset angle, and re-adjusts the tracking target to the front of the visual sight. |
| −βy ≤ offset angle ≤ βy | No rotation. |

Upon obtaining the first comparison result and the second comparison result, the robot may adjust the tracking operations in combination with the two comparison results. The tracking operations include: an angle tracking operation and a distance tracking operation. For example, the first comparison result is that the current distance is greater than Dy, and the second comparison result is that the offset angle is less than −βy. In this case, the robot performs the tracking operations of: moving towards the tracking target by a distance at a specific angular speed, wherein the distance is equal to the current distance−Dx.

In this embodiment, the current distance and the offset angle are calculated according to the tracking scenario picture photographed in real time, and then the current distance and the offset angle are compared with their corresponding predetermined threshold ranges. Afterwards, the robot performs the corresponding tracking operations according to the two comparison results. This not only ensures that the tracking target is followed, but also causes no discomfort to the tracking target.

Figure 7:
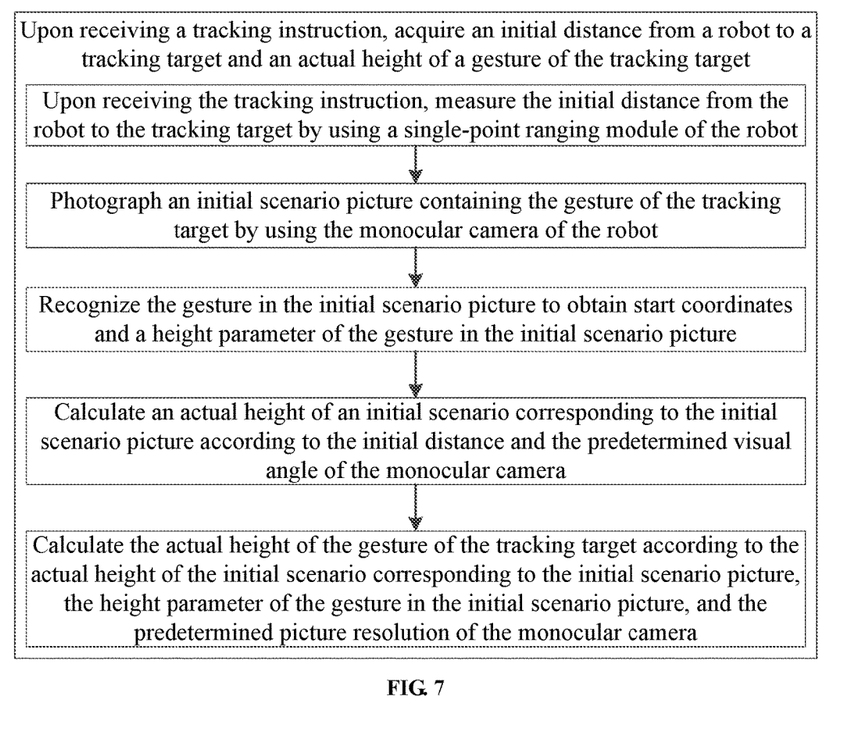
FIG. 7 is a partial flowchart of a visual tracking method based on monocular gesture recognition according to an embodiment of the present disclosure.

In another embodiment of the present disclosure, based on the above embodiment, as illustrated in FIG. 7, step S1 of upon receiving a tracking instruction, acquiring an initial distance from a robot to a tracking target and an actual height of a gesture of the tracking target specifically includes the following steps:

upon receiving the tracking instruction, measuring the initial distance from the robot to the tracking target by using a single-point ranging module of the robot (wherein the single-point ranging module may be an ultrasonic ranging sensor, an infrared ranging sensor, a laser ranging sensor or the like);

photographing an initial scenario picture containing the gesture of the tracking target by using the monocular camera of the robot;

recognizing the gesture in the initial scenario picture to obtain start coordinates and a height parameter of the gesture in the initial scenario picture; and calculating an actual height of an initial scenario corresponding to the initial scenario picture according to the initial distance and the predetermined visual angle of the monocular camera, and calculating the actual height of the gesture of the tracking target according to the actual height of the initial scenario corresponding to the initial scenario picture, the height parameter of the gesture in the initial scenario picture, and the predetermined picture resolution of the monocular camera.

Figure 1:
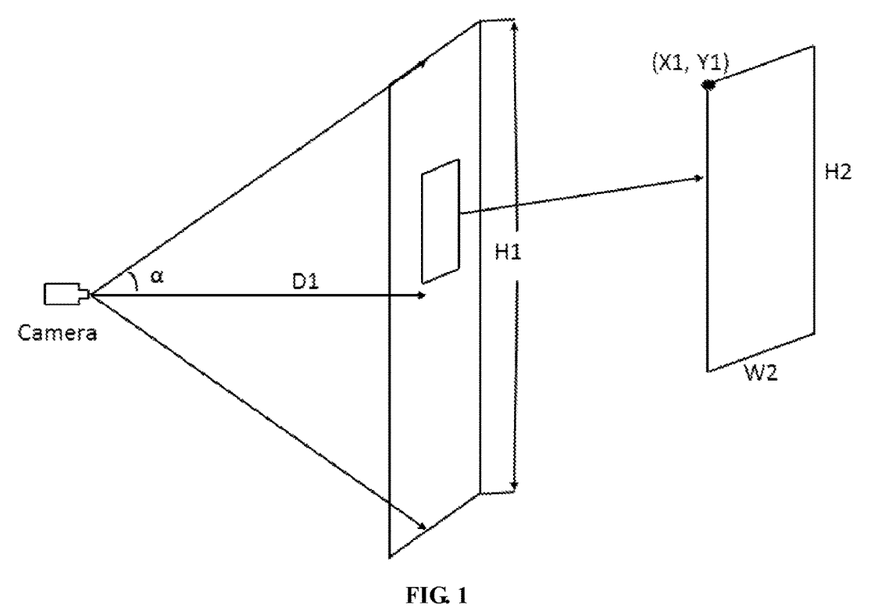
FIG. 1 is a schematic diagram of an initial photographing scenario picture according to an embodiment of the present disclosure.

Specifically, 1) as illustrated in FIG. 1, the robot photographs the initial scenario picture containing the gesture of the human body by using a camera module (that is, the monocular camera), wherein the picture resolution of the initial scenario picture is the predetermined picture resolution W1 (the width resolution)*H1 (the height resolution); according to a predetermined rule, coordinates of the first point at the upper left corner of the scenario picture photographed by the monocular camera are (1, 1), and coordinates of the last point at the right corner of the scenario picture are (W1, H1); and the gesture may be practiced by a palm or a finger, or may be practiced by other organs.

2) The robot recognizes the gesture of the human body, recognizes the gesture of the human body by using gesture recognition software (for example, a front palm), and acquires the start coordinates of the picture frame corresponding to an initial scenario picture and the size parameter of the gesture in the initial scenario picture (including: the height parameter and the width parameter).

X1: an X axis start coordinate of the start coordinates of the gesture in the initial scenario picture;

X1: a Y axis start coordinate of the start coordinates of the gesture in the initial scenario picture;

W2: an X axis width parameter in the size parameter of the gesture in the initial scenario picture;

H2: a Y axis height parameter in the size parameter of the gesture in the initial scenario picture;

H3: an actual height of the initial scenario corresponding to the initial scenario picture; and H4: an actual height of the gesture of the tracking target.

The initial distance D1 from the robot to the tracking target is measured by using a single-point ranging module of the robot.

3) The height of the initial scenario photographed by the camera is calculated according to the parameters acquired in steps 1), 2) and 3) by using the following formula:

$$H3 = 2 * \tan \alpha * D1 \quad (1)$$

In formula (1), a denotes a predetermined vertical visual angle of the monocular camera, and a predetermined visual angle is ½ of the predetermined vertical visual angle of the monocular camera.

The formula for calculating the actual height of the gesture of the tracking target may be derived by the following formula (2):

It is known that $$H3/H4 = H1/H2 \quad (2).$$

It is thus derived from formula (2) that $$H4 = H2 * H3 / H1 \quad (3).$$

wherein H4 denotes the actual height of the gesture of the tracking target, H2 denotes the height parameter of the gesture in the initial scenario picture (Y axis), H1 denotes a height resolution in the predetermined picture resolution of the monocular camera, and H3 denotes the actual height of the initial scenario corresponding to the initial scenario picture.

In another embodiment of the present disclosure, based on the above embodiment, after the actual height, the actual width and the initial distance of the initial scenario corresponding to the initial scenario picture are obtained, the tracking operations are started. 4) When human body moves forward or backward or leftward or leftward by a distance but the gesture of the human body is maintained as not within the visual field range of the camera of the robot; the robot photographs the tracking scenario picture containing the gesture of the human body by using the monocular camera. Since the picture is photographed by using the same singular camera, the resolution of the obtained scenario picture is the predetermined picture resolution W1*H1.

Figure 2:
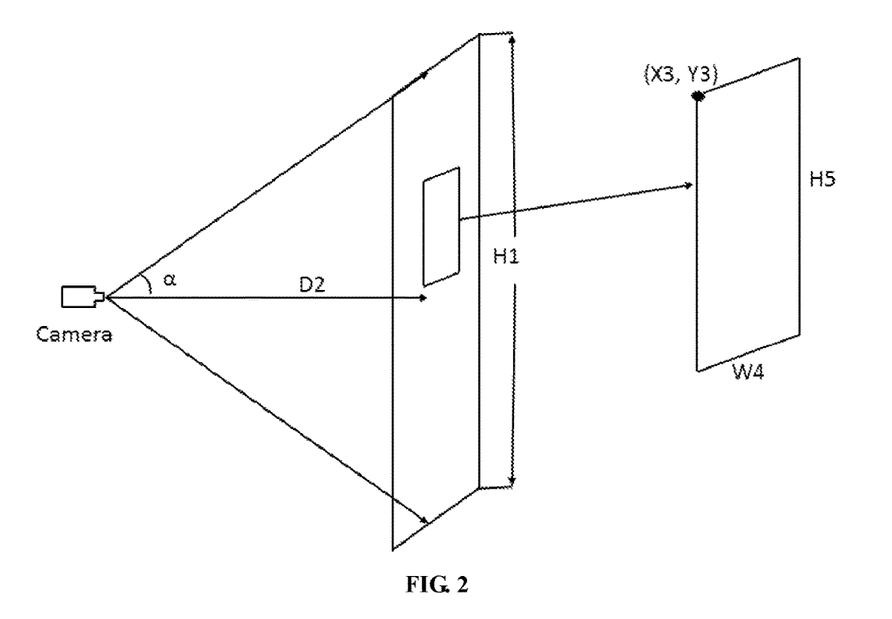
FIG. 2 is a schematic diagram of a tracking photographing scenario picture according to an embodiment of the present disclosure.

As illustrated in FIG. 2, the robot recognizes the gesture of the human body, recognizes the gesture of the human body by using gesture recognition software (for example, a front palm), and acquires the start coordinates of the picture frame corresponding to a tracking scenario picture and the size parameter of the gesture in the tracking scenario picture (including: the height parameter and the width parameter).

X3: an X axis start coordinate of the start coordinates of the gesture in the tracking scenario picture;

Y3: a Y axis start coordinate of the start coordinates of the gesture in the tracking scenario picture;

W4: an X axis width parameter in the size parameter of the gesture in the tracking scenario picture;

W5: an actual width of the tracking scenario corresponding to the tracking scenario picture photographed by the monocular camera;

H5: a Y axis height parameter in the size parameter of the gesture in the tracking scenario picture; and H6: an actual height of the tracking scenario corresponding to the tracking scenario picture photographed by the monocular camera.

5) The actual height H6 of the tracking scenario photographed by the monocular camera is calculated according to the data acquired in steps 1) to 5) by using the following formula:

$$H6 = H1 * H4 / H5 \quad (4)$$

In formula (4), H6 denotes an actual height of a tracking scenario corresponding to the tracking scenario picture, H1 denotes a height resolution in the predetermined picture resolution of the monocular camera, and H5 denotes a height parameter in the size parameter (Y axis) of the gesture in the tracking scenario picture.

Then the current distance D2 from the robot to the tracking target is calculated (that is, the distance from the photographing site to the tracking target during photographing the tracking scenario picture) by using the following formula:

$$D2=H6/(2*\tan \alpha) \quad (5)$$

In formula (5), D2 denotes the current distance from the robot to the tracking target, H6 denotes the actual height of the tracking scenario corresponding to the tracking scenario picture, and a denotes the predetermined visual angle of the monocular camera, wherein the predetermined visual angle is ½ of a vertical visual angle of the monocular camera.

Figure 8:
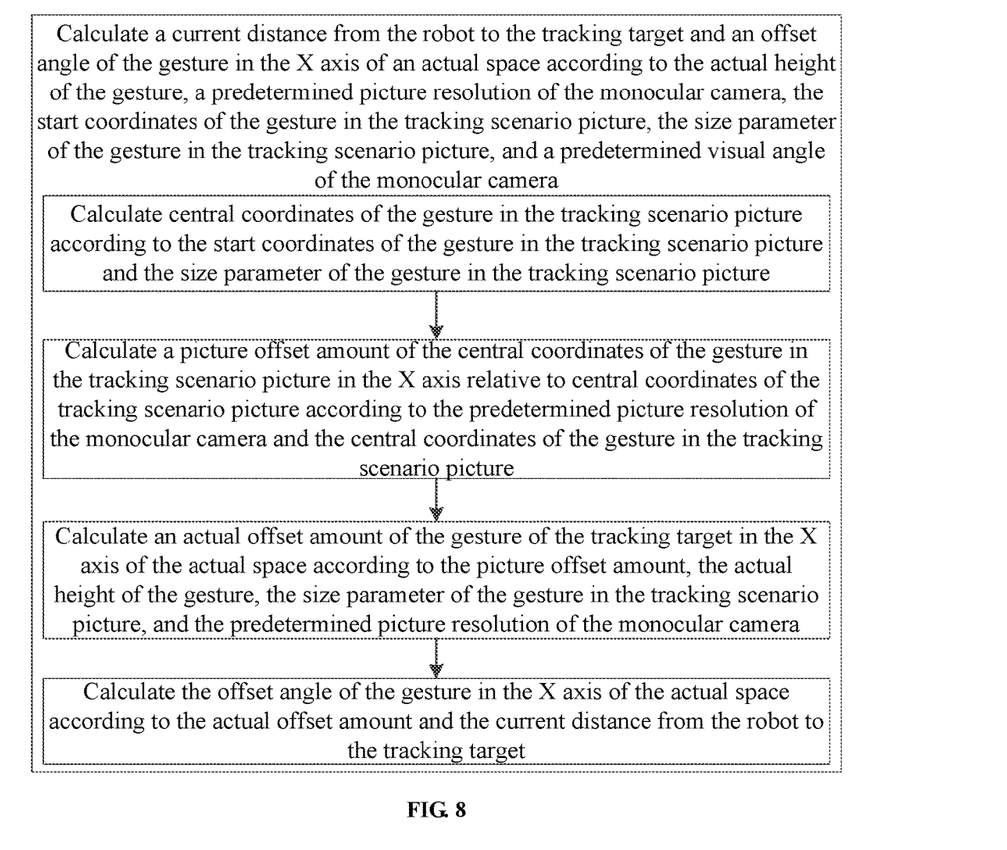
FIG. 8 is a partial flowchart of a visual tracking method based on monocular gesture recognition according to an embodiment of the present disclosure.

In another embodiment of the present disclosure, based on the above embodiment, as illustrated in FIG. 8, in the step of calculating a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera, the calculating an offset angle of the gesture in the X axis of an actual space includes the following steps:

calculating central coordinates of the gesture in the tracking scenario picture according to the start coordinates of the gesture in the tracking scenario picture and the size parameter of the gesture in the tracking scenario picture;

calculating a picture offset amount of the central coordinates of the gesture in the tracking scenario picture in the X axis relative to central coordinates of the tracking scenario picture according to the predetermined picture resolution of the monocular camera and the central coordinates of the gesture in the tracking scenario picture;

calculating an actual offset amount of the gesture of the tracking target in the X axis of the actual space according to the picture offset amount, the actual height of the gesture, the size parameter of the gesture in the tracking scenario picture, and the predetermined picture resolution of the monocular camera; and calculating the offset angle of the gesture in the X axis of the actual space according to the actual offset amount and the current distance from the robot to the tracking target.

Specifically, the photographing angle for photographing the tracking target by the robot needs to be subsequently determined. Therefore, the offset angle needs to be calculated.

calculating central coordinates (X4, Y4) of the gesture in the tracking scenario picture according to the start coordinates of the gesture in the tracking scenario picture and the size parameter of the gesture in the tracking scenario picture;

$$X4=X3+(W4/2) \quad (6)$$

$$Y4=Y3+(H5/2) \quad (7)$$

wherein in formula (6), X4 denotes an X axis coordinate of the central coordinates of the gesture in the tracking scenario picture, X3 denotes an X axis start coordinate of the start coordinates of the gesture in the tracking scenario picture, and W4 denotes a width parameter in the X axis in the size parameter of the gesture in the tracking scenario picture; and wherein in formula (7), Y4 denotes a Y axis coordinate of the central coordinates of the gesture in the tracking scenario picture, Y3 denotes a Y axis start coordinate of the start coordinates of the gesture in the tracking scenario picture, and H5 denotes a height parameter in the size parameter of the gesture in the tracking scenario picture.

The picture offset amount of the central coordinates (X4, Y4) of the gesture in the tracking scenario picture in the X axis relative to the central coordinates (W1/2, H1/2) of the tracking scenario picture is calculated by using the following formula:

$$O1=X4-(W1/2) \quad (8)$$

wherein in formula (8), O1 denotes the picture offset amount of the central coordinates of the gesture in the tracking scenario picture in the X axis relative to the central coordinates of the tracking scenario picture, X4 denotes the X axis coordinate of the central coordinates of the gesture in the tracking scenario picture, and W1 denotes a width resolution in the predetermined picture resolution of the monocular camera; and the actual offset amount of the gesture of the tracking target in the X axis of the actual space is calculated according to the picture offset amount, the actual height of the gesture, the size parameter of the gesture in the tracking scenario picture, and the predetermined picture resolution of the monocular camera by using the following formulae:

$$W5=W1*H6/H1 \quad (10)$$

wherein in formula (10), W5 denotes an actual width of the tracking scenario corresponding to the tracking scenario picture, W1 denotes the width resolution in the predetermined picture resolution of the monocular camera, and H6 denotes an actual height of the tracking scenario corresponding to the tracking scenario picture (note: the ratio of the actual space length to the pixel space length is the same as the ratio of the actual space width to the pixel space width); and $$O2=O1*W5/W1 \quad (11)$$

wherein in formula (11), O1 denotes the picture offset amount of the central coordinates of the gesture in the tracking scenario picture in the X axis relative to the central coordinates of the tracking scenario picture, W5 denotes the actual width of the tracking scenario corresponding to the tracking scenario picture, and W1 denotes the width resolution in the predetermined picture resolution of the monocular camera, and O2 denotes the actual offset amount of the gesture of the tracking target in the X axis of the actual space.

The offset angle of the gesture in the X axis of the actual space is calculated by using the following formula:

$$\beta2=\arctan(O2/D2) \quad (9)$$

wherein in formula (9), β2 denotes the offset angle of the gesture in the X axis of the actual space, O2 denotes the actual offset amount of the gesture of the tracking target in the X axis of the actual space, and D2 denotes the current distance from the robot to the tracking target.

In step 1), before or while the monocular camera photographs the first scenario picture, the robot measures the distance between the robot and the tracking target by using the single-point ranging module to acquire an initial distance D1. In this case, D1 is the value obtained via actual measurement, instead of the calculated value. After a tracking instruction is received, an initialization process is triggered, that is, the obtained initial distance (obtained via measurement), a scenario picture is photographed (that is, the initial scenario picture), and the actual height of the gesture of the tracking target calculated according to the initial scenario picture is used as a reference value. The tracking operations are performed only after these two values are obtained (which is equivalent to termination of the initialization process). The scenario pictures photographed afterwards are all tracking scenario pictures. The tracking operations are performed by calculating the current distance and the offset angle according to the initial distance and the actual height of the gesture, and the tracking scenario pictures are photographed at a specific frequency, for example, photographing each second or the like. A high photographing frequency may ensure smoothness of the tracking.

A dynamic tracking algorithm guiding the robot is formulated according to the tracking target feedback in real time, and the Z axis space distance D2 and the X axis space offset angle β2 of the robot. The robot performs the corresponding tracking operations by constantly adjusting the gesture, speed and the like of the robot (that is, performing the tracking operations according to the first comparison result and the second comparison result), such that D2 approaches the predetermined distance threshold range of between Dx and Dy, and β2 approaches the predetermined angle threshold range of between −βy and βy (nevertheless, β2 approaches 0°, such that the solution that the tracking target is in the right front of the robot is optimal), thereby obtaining a good tracking gesture.

Figure 3:
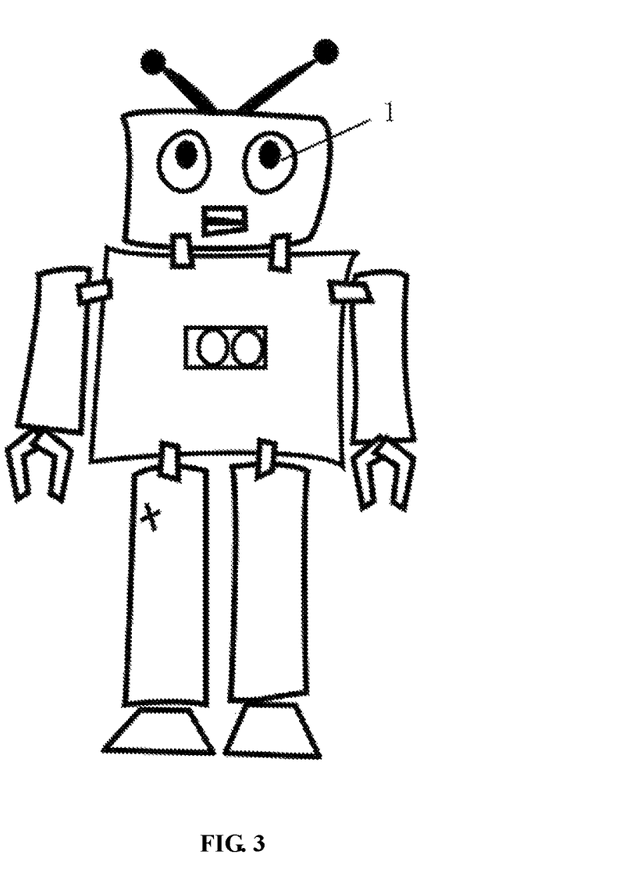
FIG. 3 is a schematic structural diagram of a robot employed in a tracking method according to an embodiment of the present disclosure.
Figure 4:
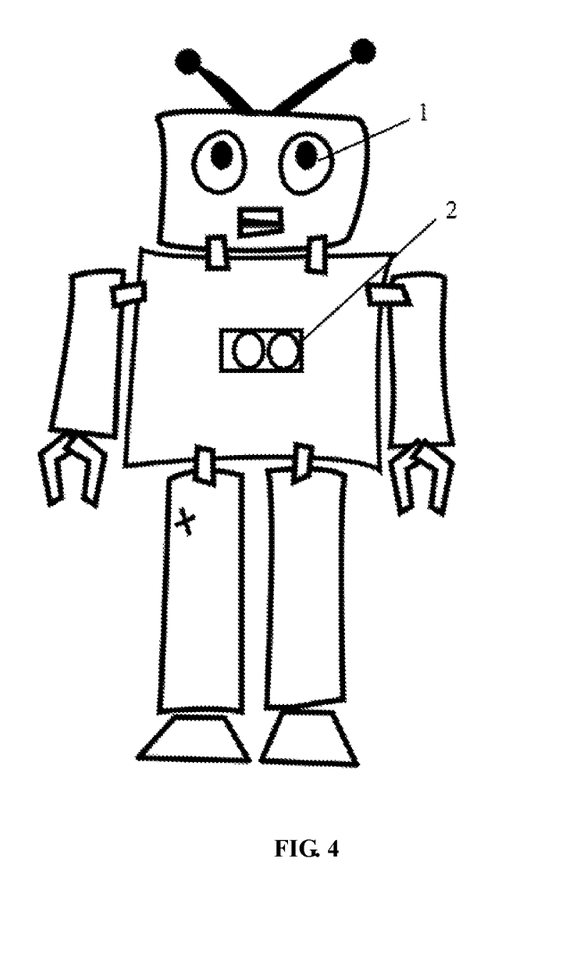
FIG. 4 is a schematic structural diagram of a robot employed in a tracking method according to another embodiment of the present disclosure.

As illustrated in FIG. 3 and FIG. 4, the robot used in the tracking method according to the present disclosure may be a humanoid robot, including an RGB camera 1 and an ultrasonic ranging sensor 2. The RGB camera 1 (that is, the monocular camera) is configured to acquire image data (that is, the initial scenario picture and the tracking scenario picture) of the human body and the gesture thereof. The ultrasonic ranging sensor 2 (which is equivalent to the single-point ranging module) is configured to measure an obstacle distance in the right front of the robot, and the ultrasonic ranging sensor 2 may also be replaced by infrared ranging, laser ranging or the like technology.

Figure 5:
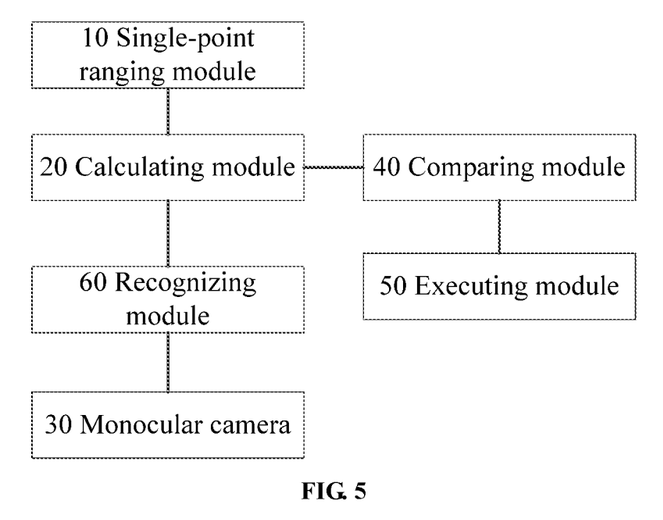
FIG. 5 is a structural diagram of a robot according to an embodiment of the present disclosure.

In another embodiment of the present disclosure, as illustrated in FIG. 5, a robot is provided. The robot includes:

a single-point ranging module 10, configured to, upon receiving a tracking instruction, acquire an initial distance from the robot to a tracking target;

a calculating module 20 (electrically connected to the single-point ranging module 10), configured to, upon receiving the tracking instruction, acquire an actual height of a gesture of the tracking target;

a monocular camera 30 (electrically connected to the calculating module 20), configured to, if the tracking target is tracked and a predetermined photographing time interval is reached, photograph a tracking scenario picture containing the gesture of the tracking target;

a recognizing module 60, configured to recognize the gesture in the tracking scenario picture to obtain start coordinates and a size parameter of the gesture in the tracking scenario picture;

wherein the calculating module 20 is further configured to calculate a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera;

a comparing module 40 (electrically connected to the calculating module 20), configured to compare the current distance with a predetermined distance threshold range to obtain a first comparison result, and compare the offset angle with a predetermined angle threshold range to obtain a second comparison result; and an executing module 50 (electrically connected to the comparing module 40), configured to control the robot to perform a corresponding tracking operation according to the first comparison result and the second comparison result.

Specifically, in consideration of convenience of the user, the initial distance from the robot to the tracking target may be measured by the single-point ranging module. The gesture may be practiced by a palm or a finger, or may be practiced by other parts of a human body (for example, a face). The actual height of the gesture of the tracking target may be calculated in the preparation process.

Upon acquiring the initial distance and the actual height of the gesture, the robot starts performing the tracking operation. The implementation of the tracking mainly includes: photographing the tracking scenario picture containing the gesture of the tracking target, determining whether the robot is far from the tracking target and whether the tracking target exceeds the predetermined angle threshold range according to the tracking scenario picture, the initial distance, the actual height of the gesture and the like information, and adjusting advance, retreat, angle and the like operation and cyclically performing the above steps, such that the robot may track the tracking target.

The predetermined distance threshold range may be determined according to a comfort degree of man-machine interaction. The tracking by the robot needs to cause no discomfort to the people (the tracking target). For example, a distance less than 0.5 m may not cause any discomfort to the tracking target. However, a distance between 1 m and 2 m may cause discomfort to man-machine interaction. In addition to man-machine interaction, such factors as the hardware restriction (visual distance and visual angle) and the tracking algorithm (or, motion algorithm) also need to be considered, to finally obtain a comfort interval threshold. The predetermined angle threshold range may also be impacted by factors in two aspects. Specific explanations may be referenced to the corresponding method embodiments, which are not described herein any further. In this embodiment, the predetermined distance threshold range may be defined as between 1 m and 1.8 m. The predetermined angle threshold range may be defined as between −18° and 18°.

Referring to Table 1 and Table 2, upon acquiring the first comparison result and the second comparison result, the robot may adjust the tracking operation thereof according to the actual needs, to obtain a good tracking state. This ensures tracking of the tracking target and causes no discomfort to the tracking target.

In another embodiment of the present disclosure, based on the above embodiment, the monocular camera 30 is further configured to photograph an initial scenario picture containing the gesture of the tracking target by using the monocular camera of the robot;

the recognizing module 60 is further configured to recognize the gesture in the initial scenario picture to obtain start coordinates and a height parameter of the gesture in the initial scenario picture; and the calculating module 20 is further configured to calculate an actual height of an initial scenario corresponding to the initial scenario picture according to the initial distance and the predetermined visual angle of the monocular camera, and calculate the actual height of the gesture of the tracking target according to the actual height of the initial scenario corresponding to the initial scenario picture, the height parameter of the gesture in the initial scenario picture, and the predetermined picture resolution of the monocular camera.

Preferably, the actual height of the initial scenario corresponding to the initial scenario picture is calculated according to the initial distance and the predetermined visual angle of the monocular camera using the following formula:

$$H3 = 2*\tan \alpha * D1 \quad (1)$$

wherein in formula (1), H3 denotes the actual height of the initial scenario corresponding to the initial scenario picture, α denotes the predetermined visual angle of the monocular camera, and D1 denotes the initial distance.

The actual height of the gesture of the tracking target is calculated according to the actual height of the initial scenario corresponding to the initial scenario picture, the height parameter of the gesture in the initial scenario picture, and the predetermined picture resolution of the monocular camera by using the following formula:

$$H4 = H2*H3/H1 \quad (3)$$

wherein in formula (3), H4 denotes the actual height of the gesture of the tracking target, H2 denotes the height parameter of the gesture in the initial scenario picture, H1 denotes a height resolution in the predetermined picture resolution of the monocular camera, and H3 denotes the actual height of the initial scenario corresponding to the initial scenario picture.

In another embodiment of the present disclosure, based on the above embodiment, the current distance from the robot to the tracking target is calculated by using the following formulae:

$$H6 = H1*H4/H5 \quad (4)$$

wherein in formula (4), H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture; and $$D2 = H6/(2*\tan \alpha) \quad (5)$$

wherein in formula (5), D2 denotes the current distance from the robot to the tracking target, H6 denotes the actual height of the tracking scenario corresponding to the tracking scenario picture, and α denotes the predetermined visual angle of the monocular camera.

In another embodiment of the present disclosure, based on the above embodiment, the calculating module 20 is further configured to:

calculate central coordinates of the gesture in the tracking scenario picture according to the start coordinates of the gesture in the tracking scenario picture and the size parameter of the gesture in the tracking scenario picture;

calculate a picture offset amount of the central coordinates of the gesture in the tracking scenario picture in the X axis relative to central coordinates of the tracking scenario picture according to the predetermined picture resolution of the monocular camera and the central coordinates of the gesture in the tracking scenario picture;

calculate an actual offset amount of the gesture of the tracking target in the X axis of the actual space according to the picture offset amount, the actual height of the gesture, the size parameter of the gesture in the tracking scenario picture, and the predetermined picture resolution of the monocular camera; and calculate the offset angle of the gesture in the X axis of the actual space according to the actual offset amount and the current distance from the robot to the tracking target.

Preferably, the central coordinates of the gesture in the tracking scenario picture are calculated by using the following formulae:

$$X4 = X3 + (W4/2) \quad (6)$$

wherein in formula (6), X4 denotes an X axis coordinate of the central coordinates of the gesture in the tracking scenario picture, X3 denotes an X axis start coordinate of the start coordinates of the gesture in the tracking scenario picture, and W4 denotes a width parameter in the size parameter of the gesture in the tracking scenario picture; and $$Y4 = Y3 + (H5/2) \quad (7)$$

wherein in formula (7), Y4 denotes a Y axis coordinate of the central coordinates of the gesture in the tracking scenario picture, Y3 denotes a Y axis start coordinate of the start coordinates of the gesture in the tracking scenario picture, and H5 denotes a height parameter in the size parameter of the gesture in the tracking scenario picture.

The picture offset amount of the central coordinates of the gesture in the tracking scenario picture in the X axis relative to central coordinates of the tracking scenario picture is calculated by using the following formula:

$$O1 = X4 - (W1/2) \quad (8)$$

wherein in formula (8), O1 denotes the picture offset amount of the central coordinates of the gesture in the tracking scenario picture in the X axis relative to the central coordinates of the tracking scenario picture, X4 denotes the X axis coordinate of the central coordinates of the gesture in the tracking scenario picture, and W1 denotes a width resolution in the predetermined picture resolution of the monocular camera; and the actual offset amount of the gesture of the tracking target in the X axis of the actual space is calculated according to the picture offset amount, the actual height of the gesture, the size parameter of the gesture in the tracking scenario picture, and the predetermined picture resolution of the monocular camera by using the following formulae:

$$W5 = W1*H6/H1 \quad (10)$$

wherein in formula (10), W5 denotes an actual width of the tracking scenario corresponding to the tracking scenario picture, W1 denotes the width resolution in the predetermined picture resolution of the monocular camera, and H6 denotes an actual height of the tracking scenario corresponding to the tracking scenario picture; and $$O2 = O1*W5/W1 \quad (11)$$

wherein in formula (11), O1 denotes the picture offset amount of the central coordinates of the gesture in the tracking scenario picture in the X axis relative to the central coordinates of the tracking scenario picture, W5 denotes the actual width of the tracking scenario corresponding to the tracking scenario picture, and W1 denotes the width resolution in the predetermined picture resolution of the monocular camera, and O2 denotes the actual offset amount of the gesture of the tracking target in the X axis of the actual space.

The offset angle of the gesture in the X axis of the actual space is calculated by using the following formula:

$$\beta 2=\arctan(O2/D2) \quad (9)$$

wherein in formula (9), β2 denotes the offset angle of the gesture in the X axis of the actual space, O2 denotes the actual offset amount of the gesture of the tracking target in the X axis of the actual space, and D2 denotes the current distance from the robot to the tracking target.

According to this embodiment, the current distance from the robot to the tracking target and the offset angle thereof may be calculated based on the above manner, such that the robot may adjust its own angle and progress route and the like to perform the tracking operation, to obtain a good tracking state.

The above embodiments are merely used to illustrate the technical solutions of the present disclosure, instead of limiting the protection scope of the present disclosure. Any modification, equivalent replacement, or improvement made without departing from the spirit and principle of the present disclosure should fall within the protection scope defined by the appended claims of the present disclosure.

What is claimed is:

1. A visual tracking method based on monocular gesture recognition, comprising the following steps:
   S1: upon receiving a tracking instruction, acquiring an initial distance from a robot to a tracking target and an actual height of a gesture of the tracking target;
   S2: if the tracking target is tracked and a predetermined photographing time interval is reached, photographing a tracking scenario picture containing the gesture of the tracking target by a monocular camera of the robot;
   S3: recognizing the gesture in the tracking scenario picture to obtain start coordinates and a size parameter of the gesture in the tracking scenario picture;
   S4: calculating a current distance from the robot to the tracking target and an offset angle of the gesture in the X axis of an actual space according to the actual height of the gesture, a predetermined picture resolution of the monocular camera, the start coordinates of the gesture in the tracking scenario picture, the size parameter of the gesture in the tracking scenario picture, and a predetermined visual angle of the monocular camera;
   S5: comparing the current distance with a predetermined distance threshold range to obtain a first comparison result;
   S6: comparing the offset angle with a predetermined angle threshold range to obtain a second comparison result; and
   S7: controlling the robot to perform a corresponding tracking operation according to the first comparison result and the second comparison result.

2. The visual tracking method based on monocular gesture recognition according to claim 1, wherein step S1 comprises the following steps:
   upon receiving the tracking instruction, measuring the initial distance from the robot to the tracking target by a single-point ranging module of the robot;
   photographing an initial scenario picture containing the gesture of the tracking target by the monocular camera of the robot;
   recognizing the gesture in the initial scenario picture to obtain start coordinates and a height parameter of the gesture in the initial scenario picture; and
   calculating an actual height of an initial scenario corresponding to the initial scenario picture according to the initial distance and the predetermined visual angle of the monocular camera, and calculating the actual height of the gesture of the tracking target according to the actual height of the initial scenario corresponding to the initial scenario picture, the height parameter of the gesture in the initial scenario picture, and the predetermined picture resolution of the monocular camera.

3. The visual tracking method based on monocular gesture recognition according to claim 2, wherein the actual height of the initial scenario corresponding to the initial scenario picture is calculated according to the initial distance and the predetermined visual angle of the monocular camera using the following formula:

$$H3=2*\tan \alpha *D1$$

wherein, H3 denotes the actual height of the initial scenario corresponding to the initial scenario picture, α denotes the predetermined visual angle of the monocular camera, and D1 denotes the initial distance.

4. The visual tracking method based on monocular gesture recognition according to claim 2, wherein the actual height of the gesture of the tracking target according to the actual height of the initial scenario corresponding to the initial scenario picture, the height parameter of the gesture in the initial scenario picture, and the predetermined picture resolution of the monocular camera by using the following formula:

$$H4=H2*H3/H1$$

wherein, H4 denotes the actual height of the gesture of the tracking target, H2 denotes the height parameter of the gesture in the initial scenario picture, H1 denotes a height resolution in the predetermined picture resolution of the monocular camera, and H3 denotes the actual height of the initial scenario corresponding to the initial scenario picture.

5. The visual tracking method based on monocular gesture recognition according to claim 1, wherein in step S4, the current distance from the robot to the tracking target is calculated by using the following formulae:

$$H6=H1*H4/H5$$

wherein, H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture; and $$D2=H6/(2*\tan \alpha)$$

wherein, D2 denotes the current distance from the robot to the tracking target, H6 denotes the actual height of the tracking scenario corresponding to the tracking scenario picture, and α denotes the predetermined visual angle of the monocular camera.

6. The visual tracking method based on monocular gesture recognition according to claim 1, wherein in step S4, the calculating an offset angle of the gesture in the X axis of an actual space comprises the following steps:
   calculating central coordinates of the gesture in the tracking scenario picture according to the start coordinates of the gesture in the tracking scenario picture and the size parameter of the gesture in the tracking scenario picture;
   calculating a picture offset amount of the central coordinates of the gesture in the tracking scenario picture in the X axis relative to central coordinates of the tracking scenario picture according to the predetermined picture resolution of the monocular camera and the central coordinates of the gesture in the tracking scenario picture;

calculating an actual offset amount of the gesture of the tracking target in the X axis of the actual space according to the picture offset amount, the actual height of the gesture, the size parameter of the gesture in the tracking scenario picture, and the predetermined picture resolution of the monocular camera; and calculating the offset angle of the gesture in the X axis of the actual space according to the actual offset amount and the current distance from the robot to the tracking target.

7. The visual tracking method based on monocular gesture recognition according to claim 6, wherein the central coordinates of the gesture in the tracking scenario picture are calculated according to the start coordinates of the gesture in the tracking scenario picture and the size parameter of the gesture in the tracking scenario picture by using the following formulae:

$$X4=X3+(W4/2)$$

wherein, X4 denotes an X axis coordinate of the central coordinates of the gesture in the tracking scenario picture, X3 denotes an X axis start coordinate of the start coordinates of the gesture in the tracking scenario picture, and W4 denotes a width parameter in the size parameter of the gesture in the tracking scenario picture; and $$Y4=Y3+(H5/2)$$

wherein, Y4 denotes a Y axis coordinate of the central coordinates of the gesture in the tracking scenario picture, Y3 denotes a Y axis start coordinate of the start coordinates of the gesture in the tracking scenario picture, and H5 denotes a height parameter in the size parameter of the gesture in the tracking scenario picture.

8. The visual tracking method based on monocular gesture recognition according to claim 6, wherein:

the picture offset amount of the central coordinates of the gesture in the tracking scenario picture in the X axis relative to central coordinates of the tracking scenario picture are calculated according to the predetermined picture resolution of the monocular camera and the central coordinates of the gesture in the tracking scenario picture by using the following formula:

$$O1=X4-(W1/2)$$

wherein, O1 denotes the picture offset amount of the central coordinates of the gesture in the tracking scenario picture in the X axis relative to the central coordinates of the tracking scenario picture, X4 denotes the X axis coordinate of the central coordinates of the gesture in the tracking scenario picture, and W1 denotes a width resolution in the predetermined picture resolution of the monocular camera; and the actual offset amount of the gesture of the tracking target in the X axis of the actual space is calculated according to the picture offset amount, the actual height of the gesture, the size parameter of the gesture in the tracking scenario picture, and the predetermined picture resolution of the monocular camera by using the following formulae:

$$H6=H1*H4/H5$$

wherein, H6 denotes an actual height of a tracking scenario corresponding to the tracking scenario picture, H1 denotes a height resolution in the predetermined picture resolution of the monocular camera, and H5 denotes a height parameter in the size parameter of the gesture in the tracking scenario picture;

$$W5=W1*H6/H1$$

wherein, W5 denotes an actual width of the tracking scenario corresponding to the tracking scenario picture, W1 denotes the width resolution in the predetermined picture resolution of the monocular camera, and H6 denotes an actual height of the tracking scenario corresponding to the tracking scenario picture; and $$O2=O1*W5/W1$$

wherein, O1 denotes the picture offset amount of the central coordinates of the gesture in the tracking scenario picture in the X axis relative to the central coordinates of the tracking scenario picture, W5 denotes the actual width of the tracking scenario corresponding to the tracking scenario picture, and W1 denotes the width resolution in the predetermined picture resolution of the monocular camera, and O2 denotes the actual offset amount of the gesture of the tracking target in the X axis of the actual space.

9. The visual tracking method based on monocular gesture recognition according to claim 6, wherein the offset angle of the gesture in the X axis of the actual space is calculated according to the actual offset amount and the current distance from the robot to the tracking target by using the following formula:

$$\beta2=\arctan(O2/D2)$$

wherein, $\beta2$ denotes the offset angle of the gesture in the X axis of the actual space, O2 denotes the actual offset amount of the gesture of the tracking target in the X axis of the actual space, and D2 denotes the current distance from the robot to the tracking target.

* * * * *